March 24, 1931.                J. B. HENDERSON                1,797,913
                    CONNECTION BETWEEN GYROSCOPE OR OTHER
                      SENSITIVE ELEMENT AND ITS FOLLOWER
                       Filed Nov. 14, 1924        2 Sheets-Sheet 1

Inventor
James B. Henderson
By Moakley & Gill
Attorneys

March 24, 1931.  J. B. HENDERSON  1,797,913
CONNECTION BETWEEN GYROSCOPE OR OTHER
SENSITIVE ELEMENT AND ITS FOLLOWER
Filed Nov. 14, 1924  2 Sheets-Sheet 2

Inventor
James B. Henderson
By Moakley & Gill
Attorneys

Patented Mar. 24, 1931

1,797,913

UNITED STATES PATENT OFFICE

JAMES BLACKLOCK HENDERSON, OF BLACKHEATH, ENGLAND

CONNECTION BETWEEN GYROSCOPE OR OTHER SENSITIVE ELEMENT AND ITS FOLLOWER

Application filed November 14, 1924, Serial No. 749,940, and in Great Britain November 22, 1923.

My invention consists in an improved method of connecting a gyroscope or other sensitive element and its follower whereby the motion of the follower affects the sensitive element to a minimum extent. In gyrocompasses, for example, the gyroscope is carried by a follower which normally hunts backwards and forwards angularly relatively to the sensitive gyroscope, and the frictional or elastic forces between the two, being of an alternating kind, have zero time integral. When the ship is turning however, the alterations are no longer equal and the time integral no longer zero and a disturbing effect is produced upon the gyroscope.

In order to reduce this disturbance the forces between the gyroscope and its follower are made as small as possible by supporting the gyroscope from the follower by flotation or by suspending the gyroscope from the follower by a torsion filament.

My invention consists of a new type of support between the sensitive element and the follower. I pivot the sensitive element on the follower on a vertical axis, the lower trunnion resting upon a ball thrust bearing. I relieve this bearing however of a large proportion of the weight by an elastic connection in thrust between the sensitive element and the follower.

This elastic connector I preferably arrange of two circular disc washers placed coaxially one above the other, say two inches apart, and connected together by a number of thin wires, preferably of steel, these wires and the washers forming a cylindrical cage which is to carry a portion or the whole of the weight of the sensitive element by axial loading.

In a thrust bearing of this kind the important factor is that the struts have a critical load which can be accurately determined and that up to that load the struts will remain straight and allow no weight to be taken by the ball. At the exact critical load the struts would remain straight if so placed, but if bent artificially they have the peculiarity that they will stay in that position when released, and that in any such position of curvature they will support the exact critical load, so that even if the curvature is sufficient to let the suspended mass down on to the ball, the weight is supported entirely by the struts and none of it by the ball. If, on the other hand, the load is made to exceed the critical load, of, say, X pounds by Y ounces, the struts will bend naturally and lower the weight down onto the ball, but of the total weight X pounds will always be carried by the struts and only Y ounces by the ball. The ball really serves only to steady the sensitive element as regards vertical motion, while if the critical load of the struts is very slightly less than the total suspended load friction between the element and the ball will be negligible. The torsional constraint due to torsional stiffness in the struts is reduced when they are bent because when relative movement occurs between the two ends of the struts, the latter have a tendency to collapse sideways as they are thrown out of the vertical plane, this tendency being in the direction of the relative movement, so that a torsional instability is introduced which has the effect of cancelling some of the torsional stability in the suspension. During such relative movement the fact that the struts are temporarily out of the vertical plane reduces the critical load slightly and entails that a small amount of the load is transferred to the ball, but as the bottom of each strut is, in effect, carried by a follow-up element, such, for example, as the follow-up of a compass, and whose function is to restore the struts immediately to the vertical plane, the incidence of this excess load on the ball is only momentary. Its amount depends, of course, on the design of the apparatus and on the amount of phase difference between the ends of the struts. Taking the mechanism of Fig. 3 as an example, and supposing the cage to have a radius of 0.375" and a length of 1.5", a hunting movement of half a degree between the top and bottom of the case would throw the struts only some 4 minutes of arc out of the vertical plane, so that the temporary diminution of the weight supported by them would be exceedingly small. It is preferred to arrange the total load to be very slightly greater than the critical load of the struts so as to avoid upend-down movement of the sensitive element during hunting, the mass resting always on the ball and any sideways inclination of each strut being accompanied by a corresponding straightening in its length due to its inherent resilience.

Figure 2:
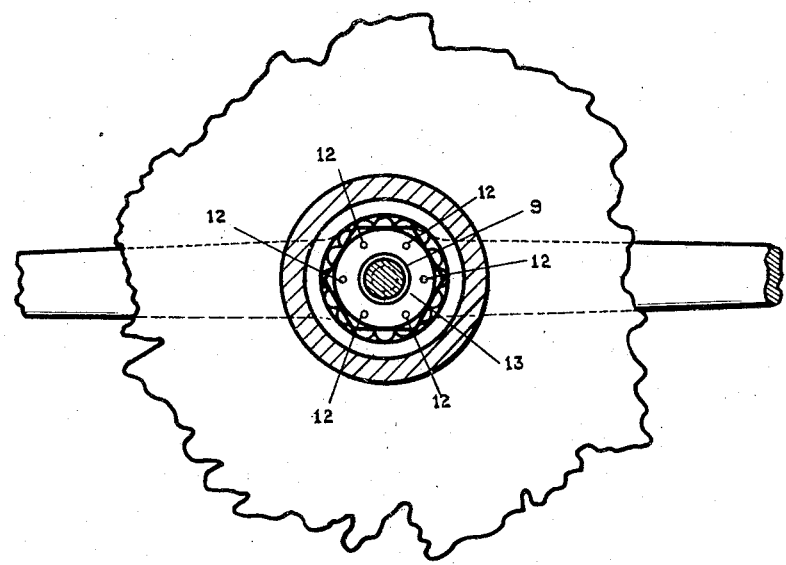
Fig. 2 shows an inverted sectional plan.
Figure 1:
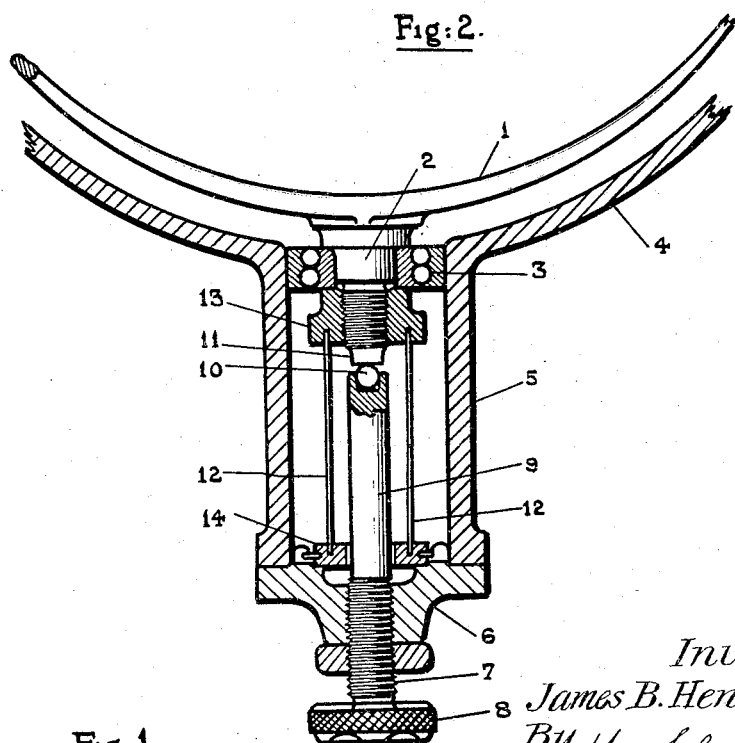
Fig. 1 shows a sectional elevation of the supporting bearings and cage.

In Figs. 1 and 2, the ring 1 is the vertical gimbal ring of the sensitive element supported on vertical trunnions 2 by ball bearings 3 in the follower 4 which is controlled in the usual manner to follow the azimuthal motion of the ring 1. The ring 4 carries a cylindrical projection 5 having a cover 6 through which passes the micrometer screw 7 adjustable by the head 8. The stem 9 of the screw 7 carries a ball 10 on its end which bears against a hardened end 11 on the trunnion 2. The weight of the sensitive element is taken partly by the ball 10 and partly by six wires 12 of a flexible metallic thrust element. The wires are under compression due to the thrust of the sensitive element and act as struts between two rings 13 and 14, the former being screwed onto the trunnion 2 and the latter resting on the cap 6, a spring washer or cup 14ª introducing a frictional grip between the ring 14 and the tubular cylindrical projection 5 so that there will be no tendency for the ring to turn in azimuth when there is a relative displacement of the rings 1 and 4. The division of the load between the ball 10 that forms an auxiliary bearing and the struts 12 can be adjusted by the micrometer screw 8, that is to say, whether the ball shall carry part of the load, or none at all, since, as has already been explained, the portion of the weight supported by the struts must always be their natural critical load. This division of the load can only be varied by screwing up the ball tight so as to put the struts under tension.

The stiffness of the struts 12 may be chosen to be capable of taking the whole weight of the sensitive element and the ball 10 may then be adjusted to take no weight but merely to act as a guard to save the struts 12 against sudden shock. The torsional stiffness of the struts 12 is the chief objection to such an arrangement.

Figures 3, 4:
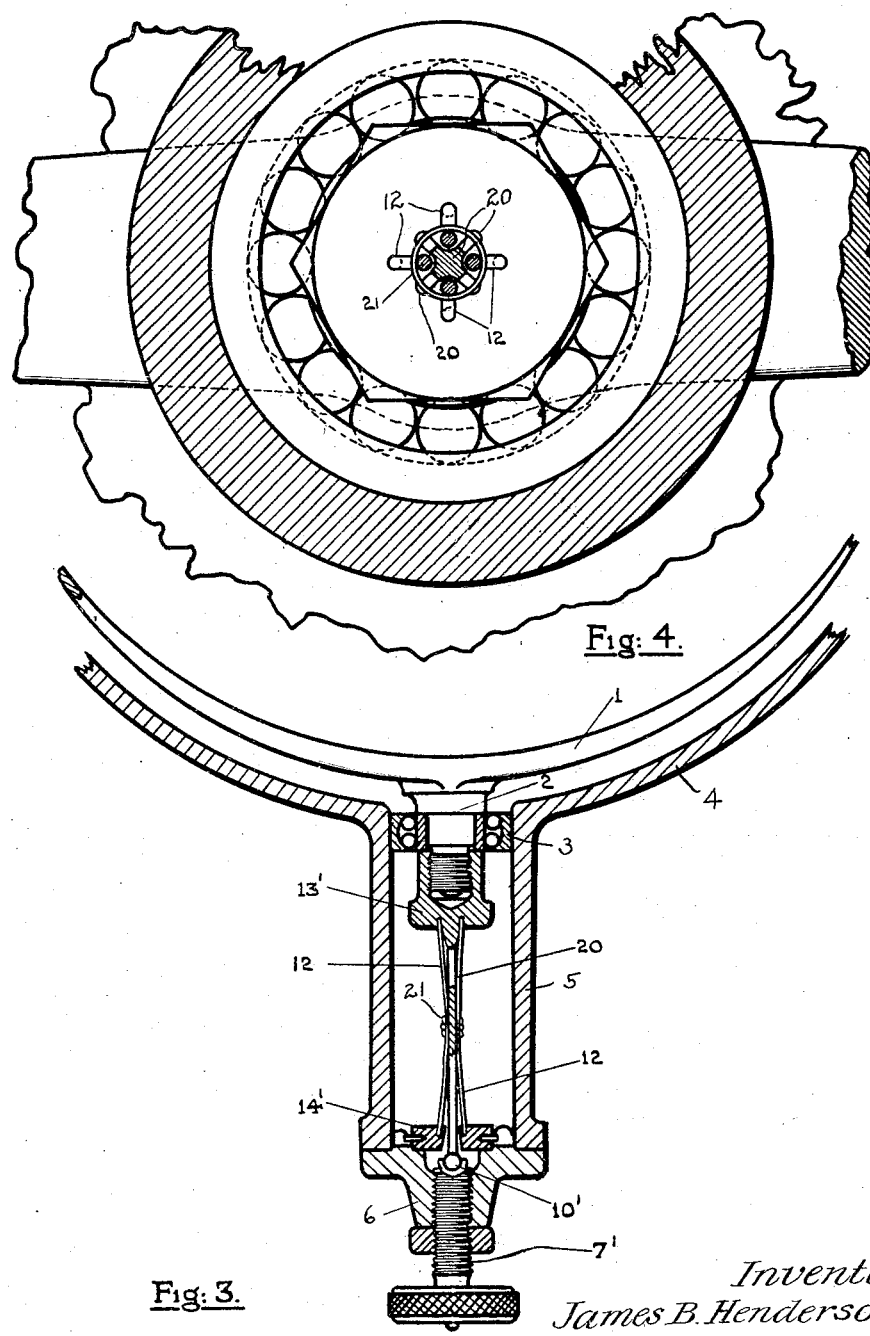
Figs. 3 and 4 show similarly an alternative arrangement of the cage.

In order to diminish this torsional stiffness I preferably design the struts 12 so that the load on them exceeds their critical load by a small amount which is taken by the ball bearing 10. Figs. 3 and 4 show an arrangement in which four struts 12 are used and are loaded beyond their critical load so that they have buckled inwardly toward the central stem 20 which is solid with the nut 13' and bears on a ball 10' that forms an auxiliary bearing and is on the end of the micrometer screw 7. The struts 12 extend between the nut 13' and a ring 14', a spring washer or cup 14ª introducing a frictional grip between ring 14' and the outer tubular cylindrical projection 5 thereby preventing a tendency for the ring to turn in azimuth upon relative displacement of the rings 1 and 4. A cross section of the wires 12 and stem 20 is shown on a larger scale in Fig. 4, from which it will be seen that the stem 20 has a cruciform section and the four wires 12 are held in the middle of their length in the four corners of the stem 20 by a ring 21 so as to ensure that all four struts will buckle in the radial direction of the trunnion 2 when loaded beyond their critical load.

Referring to the ball bearing 3 within the cylindrical projection 5, the former should have a sliding fit without side play in the cylindrical member 5, so that the ball bearing 3 can be adjusted vertically with the sensitive element, of which 1 is the vertical gimbal ring, through vertical adjustment of the ball 10 by means of the screw 7 and its operable head 8. If, however, the ball bearing 3 is constructed to give a certain amount of end play, then, its outer ring can be inserted in the cylindrical projection 5 with a push fit provided it is located so that it does not bear any of the thrust load. That is to say, if the thrust struts, as 12 in Fig. 1, are kept straight and the thrust ball 10 is adjusted a little lower than the tip 11 of the trunnion 2, so as only to take a load when the struts bend slightly, then the ball bearing 3 must be located so that the trunnion 2 rests on the ball before the bearing reaches the limit of its end play. Where the sensitive element is adjusted so as to rest permanently on the ball, then no end play is required either in the ball bearing or between the bearing and the cylindrical wall 5, but care must be taken that the excess thrust load, over and above the critical load of the struts, falls entirely on the ball 10, and none of it on the ball bearing 3.

The simplest arrangement is to make the ball bearing 3 a close sliding fit in the cylindrical projection 5, as it is then applicable to all arrangements of the thrust element. The only precaution in all arrangements is to ensure that the ball bearing 3 acts only as a radial guide bearing, with no side play, and that it takes none of the thrust load.

I claim:—

1. A connection between a sensitive element and a follower comprising a support for the sensitive element sustaining the weight thereof, a follower, and a flexible metallic thrust element supporting said support from said follower.

2. A connection between a sensitive element and a follower comprising a support for the sensitive element, a follower, a flexible metallic thrust element supporting said support from said follower, and an auxiliary bearing positioned to co-operate with said thrust element during shock loads in supporting said sensitive element support to protect said thrust element from an excessive load.

3. A connection between a sensitive element and a follower comprising a support for the sensitive element, a follower, and a flexible thrust element supporting said support from said follower, said thrust element comprising a plurality of wire struts.

4. A connection between a sensitive element and a follower comprising a support for the sensitive element, a follower, and a flexible thrust element supporting said support from said follower, said thrust element comprising wire struts loaded to their critical load.

5. A connection between a sensitive element and a follower comprising a support for the sensitive element, a follower, a thrust element comprising flexible wire struts and supporting said support from said follower, and means controlling the direction of flexure of said struts.

6. A connection between a sensitive element and a follower, a support for the sensitive element, a follower, a flexible metallic thrust element and a rigid bearing each of which coacts with said follower to partly support the sensitive element support therefrom and one of which is adjustable.

7. A connection between a sensitive element and a follower comprising a support for the sensitive element sustaining the weight thereof, a follower, and a flexible metallic thrust element supporting said support from said follower and adapted to support a predetermined critical load.

8. A connection between a sensitive element and a follower comprising a support for the sensitive element sustaining the weight thereof, a follower, a flexible metallic thrust element supporting said support from said follower and adapted to support a predetermined critical load, and an auxiliary bearing positioned to co-operate with said thrust element by supporting the excess of the total load over said critical load.

9. A connection between a sensitive element and a follower comprising a support for the sensitive element sustaining the weight thereof, a follower, a flexible metallic thrust element supporting said support from said follower and adapted to support a predetermined critical load, and an auxiliary bearing positioned to co-operate with said thrust element by supporting the excess of the total load over said critical load and to position said support.

10. A connection between a sensitive element and a follower comprising a support for the sensitive element, a follower, a flexible thrust element supporting said support from said follower, said thrust element comprising wire struts loaded beyond their critical load, and an auxiliary rigid bearing to position the said support and to carry the excess weight of the suspended mass over said critical load.

JAMES BLACKLOCK HENDERSON.